United States Patent [19]

Oguchi

[11] 4,356,482

[45] Oct. 26, 1982

[54] IMAGE PATTERN CONTROL SYSTEM

[75] Inventor: Tetsuji Oguchi, Tokyo, Japan

[73] Assignee: Nippon Electric Co., Ltd., Tokyo, Japan

[21] Appl. No.: 155,378

[22] Filed: Jun. 2, 1980

[30] Foreign Application Priority Data

Jun. 5, 1979 [JP] Japan .................................. 54-70341

[51] Int. Cl.3 .......................... G09G 1/16; G06F 3/14

[52] U.S. Cl. .................................... 340/731; 340/744; 340/799; 364/200

[58] Field of Search ....................... 340/731, 798, 799; 364/200 MS File

[56] References Cited

U.S. PATENT DOCUMENTS 3,226,691 12/1965 Hazard ............................... 364/200

4,127,851 11/1978 Middel ............................ 340/799 X 4,223,353 9/1980 Keller et al. .................... 340/799 X

OTHER PUBLICATIONS

Hewlett-Packard Journal, Jan. 1978, vol. 29, No. 5, 24 pp.

*Primary Examiner*—David L. Trafton

*Attorney, Agent, or Firm*—Townsend and Townsend

[57] ABSTRACT

An image pattern control system of the type having a dynamic memory which operates during a first period to read and rewrite the contents of memory according to address data sent from an address register and to refresh stored data according to the output of a refresh counter during a subsequent second period. The first and second periods are switched according to the output of a zoom ratio hold register.

9 Claims, 8 Drawing Figures

IMAGE PATTERN CONTROL SYSTEM

BACKGROUND OF THE INVENTION

The present invention relates to an image pattern control system which forms an image pattern to be displayed on a cathode ray tube (CRT) or other scanning display apparatus, and more particularly to an image pattern control system for displaying a magnified image pattern by use of a dynamic memory which needs a refresh operation.

Currently, a great number of image pattern control systems are available, in which image signals are controlled digitally by a microprocessor and literal and graphic patterns are displayed on a screen of a CRT and the like using a raster scanning system.

In these image pattern control systems, data for an image pattern to be displayed is stored in a memory and read out in the sequence of display corresponding to each raster scanning, and a semiconductor integrated circuit memory is generally employed for the memory.

Semiconductor integrated circuit memories fall into two types: the dynamic memory which needs refreshing of the memory contents in a certain time interval and the static memory which does not need refreshing because of its self-retaining capability. The dynamic memory which provides a large storage capacity at a low cost is advantageous for the image pattern memory in an image pattern control system. Such an image control system using a dynamic memory is disclosed, for example, in an article in the "HEWLETT-PACKARD JOURNAL" published by Hewlett-Packard Company in 1978.

However, image pattern control systems using dynamic memories have a difficulty in that a displayed pattern would fade too quickly or part of an image pattern could not be displayed unless refreshing is carried out smoothly.

In the prior art, a dynamic memory of the RAM type (Random Access Memory), which can afford to read and write data, has been used for the pattern memory, and scanning of a raster on the CRT screen and memory addressing have been carried out as shown in FIG. 1. In this case, pattern data stored in addresses 000 through 03F (in hexadecimal notation) is read out sequentially when the first scanning line is output on the display screen, so that fragments of an image pattern are displayed in the positions corresponding to the addresses as shown in FIG. 1. In the same way, image data stored in addresses 040 to 07F and 080 to OBF is read out from the pattern memory corresponding to the second and third scanning lines, respectively, and visualized on the display screen.

When image data stored in the pattern memory are read out continuously in the order of addresses, the read out data are fed back to the memory within the read-out timing period and rewritten thereinto automatically. Thus, reading and refreshing of data are carried out at the same time.

When a fragment of pattern which is displayed in a minimum picture element area on the CRT screen (unit address position) is to be magnified, doubled for example, continuously in both the horizontal and vertical directions, the pattern memory is addressed in a double time interval horizontally and vertically with respect to the display screen, as shown in FIG. 2. It can be seen from the figure that addressing of data takes place for 000 to 01F, then skips to 040 to 05F, and intermediate data in 020 to 03F is not read out. Therefore image data stored in the addresses 020 to 03F must be read out separately for refreshing.

In order to solve this problem, in the prior art, a special refresh cycle as shown in FIG. 3 was provided for addressing image data which is not actually displayed on the screen. In this case, refreshing is carried out by reading out image data which is not displayed in the hatched portion in FIG. 3 inhibiting the delivery of this data to the CRT display unit. Accordingly, in the case of FIG. 3, output cycles of scanning lines having even numbers must be assigned to refreshing.

Therefore, according to the prior art, a pattern can be enlarged continuously in the horizontal direction on the screen, but cannot be enlarged continuously in the vertical direction. That is, when a pattern is enlarged horizontally, data cannot be displayed on scanning lines having even numbers. A drawback of the prior art, in other words, is that a pattern cannot be displayed on all dots on the display screen.

As mentioned above, the conventional method using a dynamic memory for pattern memory has a disadvantage that an enlarged pattern cannot be displayed continuously on the screen, because data cannot be displayed during the refreshing. This drawback leads to poor visibility when displaying graphic and literal patterns.

SUMMARY OF THE INVENTION

It is an object of the present invention to provide an image pattern control system which can magnify a display pattern in both the horizontal and vertical directions and can display a fine continuous pattern by displaying data even during memory refresh cycles.

In brevity, according to the present invention, in order that an image signal of a pattern to be displayed at predetermined positions on the display screen or an image control signal which forms the pattern is read out from a memory and displayed on the screen in a magnified scale, there are provided a first period during which the image signal or image control signal of the pattern to be displayed in a magnified scale is read out from the memory and a second period during which a fragment of the pattern is displayed in a magnified scale according to the image signal or image control signal, at least one of the image signal and image control signal stored in the memory being rewritten into the memory in the second period.

According to the present invention, there is provided an image pattern control system comprising a dynamic memory, a zoom ratio hold register, an address register which stores addresses for reading out the contents of the dynamic memory, a refresh address counter which stores addreses of the contents read out from the dynamic memory for refreshing, a switch circuit which sends out a control signal at a predetermined timing according to an output of the zoom ratio hold register, and a switch circuit which, under the control of the control signal, selects outputs of the address register and the refresh address counter to send the output of the address register to the dynamic memory during a first period and the output of the refresh address counter to the dynamic memory during a subsequent second period, whereby the dynamic memory reads and rewrites stored data according to the address register output during the first period and refreshes stored data according to the refresh address counter output during the subsequent second period related to a magnified display.

DESCRIPTION OF THE PREFERRED EMBODIMENT

Figure 1:
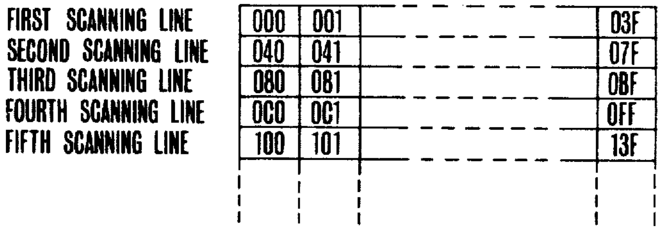
FIG. 1 is an illustration showing a correspondence between pattern memory addresses and display areas for a normal display by the conventional image control system and also by that according to the present invention.
Figure 2:
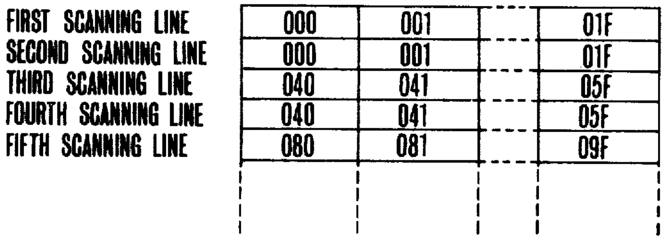
FIG. 2 is an illustration showing a correspondence between pattern memory addresses and display areas for a double-scale display by the conventional image control system without a forced refreshing.
Figure 3:
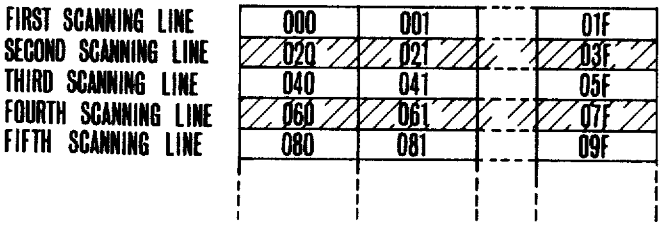
FIG. 3 is an illustration showing a correspondence between pattern memory addresses and display areas for a double-scale display by the conventional image control system with a forced refreshing.
Figure 7:
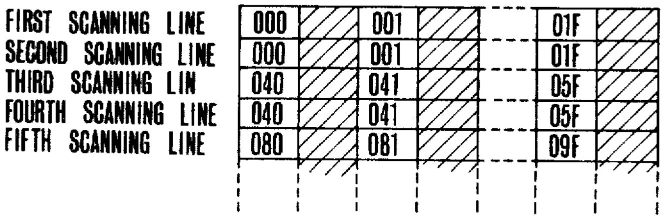
FIG. 7 is an illustration showing a correspondence between pattern memory addresses and display areas when refreshing is carried out for a double-scale display by the image pattern control system according to the present invention.
Figure 4:
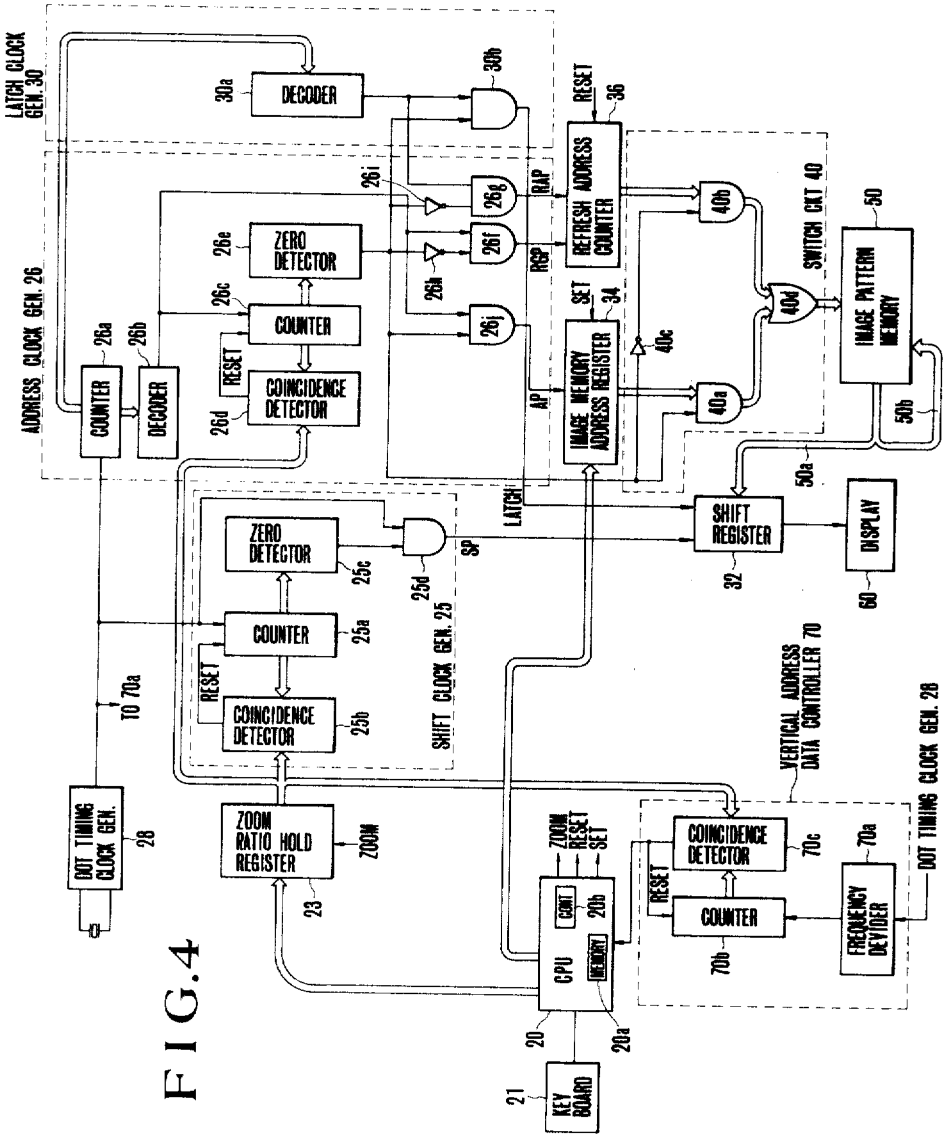
FIG. 4 is a schematic block diagram of the image pattern control system embodying the present invention.

FIG. 4 shows a preferred embodiment of the image pattern control system according to the present invention. A control system 10 shown in the figure operates under control of a computer, and the general principle of such a system is known, for example, from the above mentioned publication. Therefore, this figure shows, in detail, portions which are specifically related to the present invention and other portions in brief. The control system 10 is provided with a central processing unit (CPU) 20 which is the computer by itself with an associated keyboard 21, through which various data is set up and execution commands are given by manual operation.

The CPU 20 sends control data for a magnified display to a zoom ratio hold register 23. This is a 2-bit register, for example, storing binary data "01" when the zoom ratio or scale factor is "2," or binary data "10" or "1" for scale factor "3" or "4," respectively. When the scale factor is "1," the register 23 stores "00." The register 23 stores zoom ratio data sent from the CPU 20, and sends its output to a shift clock generator 25 and an address clock generator 26 when it receives a magnification display signal ZOOM from the CPU 20. These clock generators 25 and 26 receive a basic timing clock signal from a dot timing clock generator 28 and an output of a latch clock generator 30, and produce at predetermined timings shift pulse SP, pattern memory address pulse AP, refresh address clock pulse RAP, and refresh gate pulse RGP.

The dot timing clock generator 28 generates a clock pulse at 20 MHz, for example, which determines the display area for a single dot. The shift clock generator 25 consists of a counter **25*a* of a 4-bit type, for example, which counts the basic clock from the dot clock generator 28, a coincidence circuit 25*b* which compares parallel output of the counter 25*a* with output of the zoom ratio hold register 23 to detect their coincidence, a zero detector 25*c* which receives the parallel output of the counter 25*a* and sends out an output when it detects that the counter contents become zero, and an AND gate 25*d* which transmits the output of the dot timing clock generator 28 as it is enabled by receiving the output of the zero detector 25*c*. The coincidence circuit 25*b* sends out an output to reset the counter 25*a*** when it detects the coincidence of the two inputs.

The address clock generator 26 consists of a counter **26*a* of a 4-bit type, for example, which counts the output of the dot timing clock generator 28, a decoder 26*b* which divides the frequency of the output of the dot timing clock generator 28 by ten, for example, by implementing a parallel output of the counter 26*a*, a counter 26*c* which counts the output of the decoder 26*b*, a coincidence circuit 26*d* which compares a parallel output of the counter 26*c* with output of the zoom ratio hold register 23 to detect their coincidence, a zero detector 26*e* which receives the parallel output of the counter 26*c* and sends out an output when it detects that the counter contents become zero, AND gates 26*f*, 26*g* and 26*j*, and inverters 26*h* and 26*i***.

The parallel output of the counter **26*a* within the address clock generator 26 is also sent to the latch clock generator 30. The latch clock generator 30 consists of a decoder 30*a* which produces a latch timing signal from the parallel output of the counter 26*a* and an AND gate 30*b* which receives the output of the decoder 30*a* and the output of the zero detector 26*e* within the address clock generator 26** to produce a double image output latching signal.

The output of the AND gate **30*b* is sent to an image data parallel-to-serial converting shift register 32 as latch signal LATCH. The output of the decoder 30*a* is also supplied to one input terminal of the AND gate 26*g* within the address clock generator 26**.

The AND gate **26*g* receives at the other input terminal the output of the zero detector 26*e* through the inverter 26*i*. The aforementioned count clock signal RAP is sent out from the AND gate 26*g* to a refresh address counter 36 which will be explained later. The AND gate 26*f* receives the outputs of the zero detector 26*e* through the inverter 26*h* and output of the decoder 26*b*, and sends out the refresh gate pulse RGP to the refresh address counter 36. The AND gates 26*f* and 26*j*** send out their outputs AP and RGP alternately depending on their input conditions.

A pattern memory address register 34 is controlled by the output of the AND gate **26*j* for reading out its contents. That is, it sends out an address of stored image data, one of "000," "001," "002," and so on for example, to an AND gate 40*a* within a switch circuit 40 each time it receives the output of the AND gate 26*j*. The output of the AND gate 26*j* has a frequency of 2 MHz, for example. The pattern memory address register 34 sequentially stores image data addresses, such as the aforementioned "000," "001" and so on, sent from the CPU 20 in response to a set signal SET from the CPU 20**.

The refresh address counter 36 sequentially counts the RAP signal from the AND gate **26*g* and sends out its contents to an AND gate 40*b* within the switch circuit 40 each time it receives an RGP signal from the AND gate 26*f***.

The switch circuit 40 further comprises an inverter **40*c* and an OR gate 40*d*. The AND gate 40*b* receives the output of the zero detector 26e within the address clock generator 26 through the inverter 40c, and relays the output of the refresh address counter 36 to the OR gate 40d when output of the inverter 40c is "1." The AND gate 40a relays the output of the image memory address register 34 to the OR gate 40d as it receives "1" from the zero detector 26e. The OR gate 40d relays the output of either AND gate 40a or 40b to the pattern memory 50. Thus the switch circuit 40 relays to the subsequent stage the output of the image memory address register 34 when the output of the zero detector 26e is "1," and the output of the refresh address counter 36** when the zero detector output is "0."

The image pattern memory 50 is of the dynamic memory type, sending out image data on line 50a to a shift register 32 and at the same time rewriting the data into itself on line 50b when it is accessed by the output of the OR gate 40d. For a continuous display, that is, display at a scale factor of "1," reading and refreshing are carried out simultaneously as in the case of usual dynamic memories. However, for a magnification display by which the present invention is characterized, a first read operation identical to the above mentioned operation is followed by a memory refresh operation even if new data for the next magnification display has not been received. Thus, magnification display data is retained on the screen during the refresh operation.

The image pattern memory 50 stores all picture element patterns which form a complete pattern displayed on the screen. One picture element is made up of, for example, a (7×8) dot matrix in this memory 50 which is a RAM.

The shift register 32 fetches the parallel output of the image pattern memory 50 when it receives the output of the AND gate 30b within the latch clock generator 30 and latches the parallel output and sends out the latched image data as a serial image signal to a CRT display unit 60 in response to an SP signal from the shift clock generator 25. The CRT display unit 60 is of a known display apparatus using a cathode ray tube, displaying an image pattern according to the serial image signal while making a scan on the screen .

The output of the dot timing clock generator 28 is also sent to a frequency divider 70a within a vertical address data controller 70. Upon completion of each scanning, the frequency divider 70a sends a pulse to a counter 70b, which counts up these pulses until it is reset by the output of a coincidence circuit 70c. The coincidence circuit 70c compares a parallel output of the counter 70b with the output of the zoom ratio hold register 23, and sends "1" to the counter 70b and a controller 20b within the CPU 20 when it detects the coincidence of the two inputs. Then, data to be sent from memory 20a within the CPU 20 to the pattern memory address register 34 is selected.

Operation of the control system 10 having the above structure will now be described.

In the case of display on the CRT screen for display data which is read out continuously from the image pattern memory 50, data "00" for scale factor "1" is keyed-in on the keyboard 21, or designated by a program, and sent to the zoom ratio hold register 23 through the CPU 20. At this time, the refresh address counter 36 is supplied with a reset signal from the CPU 20. The image memory address register 34 is supplied with pattern memory address data which is sent from the CPU 20 directly or through a buffer register (not shown in the figure), and it fetches the data when it receives a SET signal from the CPU 20.

Figure 5:
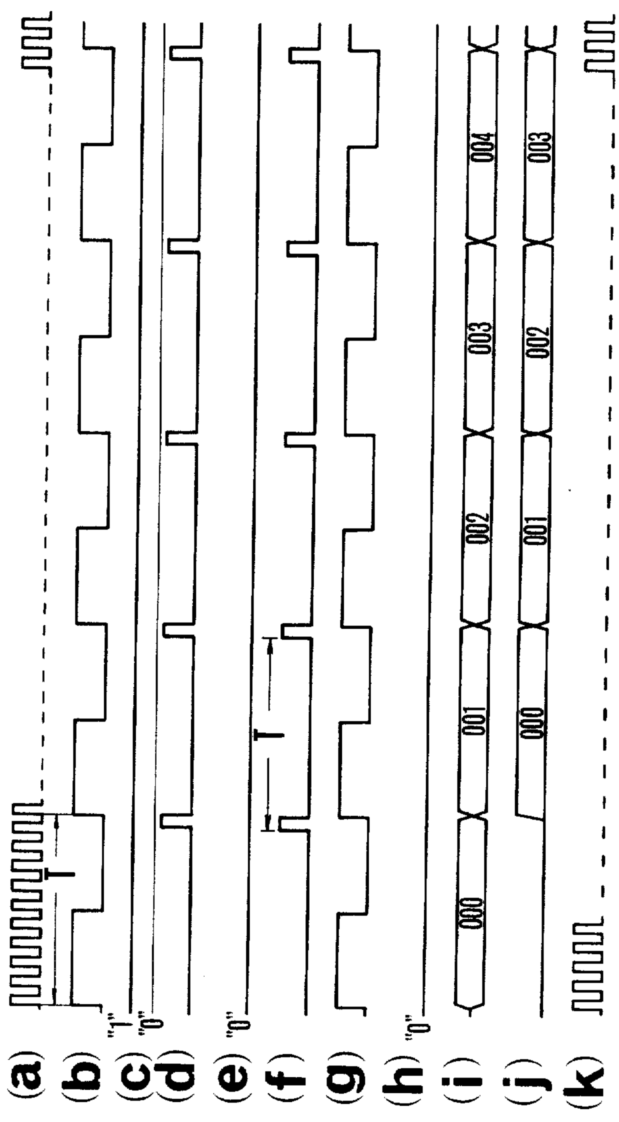
FIGS. 5 and 6 are timing charts showing the operation of the control circuit in FIG. 4.

In this state, read-out control is carried out as follows:

A timing clock (FIG. 5, (*a*)) at a frequency of 20 MHz, for example, from the dot timing clock generator 28 is sent to the counter 26a and counted. The counter 26a is reset when the count reaches "10," and it starts counting from the beginning repeatedly. Thus, the counter 26a counts down the frequency of the timing clock signal by 1/10 to produce a 2-MHz address clock signal. The contents of the counter 26a are put into the decoder 26b in parallel. The decoder 26b produces a signal at a frequency of 1/10 that with the timing clock signal and of a 50% duty cycle (period=T) (FIG. 5(*b*)), and sends it to the counter 26c and AND gates 26f and 26j.

Since the zoom ratio hold register 23 contains "00," the coincidence circuit 26d compares the output of the register 23 with the contents of the counter 26c, and sends a reset signal to the counter 26c when it detects their coincidence.

This reset signal is issued immediately before or simultaneously with the start of counting by the counter 25a. During this time, the counter 26c keeps zero, and thus the zero detector 26e maintains its output at "1" as shown in FIG. 5(*c*). This means that the zero detector 26e controls the transmission of the pattern memory address to the pattern memory 50. The output of the zero detector 26e is further sent to the switch circuit 40, AND gates 26j and 30b, and inverters 26h and 26i. The decoder 30a sends its output, shown in FIG. 5(*d*), to the AND gates 26g and 30b depending on a pattern at a time when the counter 26a has counted 10 pulses.

The AND gate 26g is closed at this time, since the output of the inverter 26a is "0," and it outputs "0" as shown in FIG. 5(*e*). The AND gate 30b receives "1" from the zero detector 26e at this time, and sends the LATCH signal with a period of T as shown in FIG. 5(*f*), to the shift register 32. The AND gate 26j receives "1" from the zero detector 26e (FIG. 5(*c*)) and the output of the decoder 26b (FIG. 5(*b*)), and sends out a pattern memory address pulse AP (FIG. 5(*g*)). In this case, the AND data 26f is supplied with "0" from the inverter 26h, and it does not have a positive output, as shown in FIG. 5(*h*).

When the image memory address register 34 receives an address pulse AP from the AND gate 26j, it sends the contents (output "000" in FIG. 5(*i*)) to the AND gate 40a. The AND gate 40a is then in the enabled state by receiving "1" from the zero detector 26e within the address clock generator 26, and transmits output "000" (FIG. 5(*i*)) from the address register 34 to the pattern memory 50 through the OR gate 40d.

Receiving an address signal, "000" for example, from the OR gate 40d, the image pattern memory 50 sends an image data stored in that address over lines 50a and 50b. Data on the line 50b is returned to the memory 50 and rewritten into it. While the output of the address register 34 is sent to the image pattern memory 50, the inverter 40c outputs "0," and the AND gate 40b is kept disabled regardless of the output from the refresh adders counter 36.

The shift register 32 fetches the output of the image pattern memory 50 when it receives a latch clock signal, LATCH, shown in FIG. 5(*f*). This state is shown in FIG. 5(*j*).

On the other hand, the output of the zoom ratio hold register 23 is supplied to the coincidence circuit 25b, which also receives the parallel output of the counter 25a that, in turn, receives the output of the dot timing clock generator 28. Accordingly, the coincidence circuit 25b sends a reset signal to the counter 25a each time it receives a signal from the clock generator 28. Thus, the counter 25a is always reset to zero. Consequently, the zero detector 25c sends steady output "1" to the AND gate 25d. The AND gate 25d is enabled by receiving the output of the zero detector 25c, and transmits the output of the dot timing clock generator 28 (FIG. 5(*a*)) to the shift register 32, as shift pulse SP (FIG. 5(*k*)) having a frequency of 20 MHz.

The shift register 32 converts the parallel image pattern data coming from the image pattern memory 50 into serial data at a timing of each shift pulse SP, and sends it to the CRT display unit 60 sequentially. Image data sent out from the image pattern memory 50 is fed back into it over the line 50b for refreshing.

The above operation is repeated each time an address clock signal is sent out from the decoder 26b. Image pattern data is read out sequentially from the image pattern memory 50 according to address data such as "001," "002," and so on, stored in the address register 34, and sent to the shift register 32. Then, display data is converted from the parallel form into the serial form, and sent to the CRT display unit 60.

On the screen of the CRT display unit 60, image data read out from the image pattern memory 50 is displayed sequentially on the first scanning line, second scanning line, and so on, following the above operation.

For a double-scale display, data "01" indicating display scale factor 2 is sent from the CPU 20 to the zoom ratio hold register 23, and stored by the ZOOM signal. Accordingly, the coincidence circuit 26d within the address clock generator 26 issues a coincidence signal to reset the counter 26c each time the counter 26c counts an output of the decoder 26b (FIG. 6(*a*)). That is, the counter 26c repeats counting and resetting within a period of 2T which is twice as long as the period in the case of a continuous display. The zero detector 26e outputs "1" for a duration of $2t_1$ each time the counter 26c receives a reset signal from the coincidence circuit 26d. The zero detector 26e changes the state of its output each time the counter 26a counts ten output pulses of the dot timing clock generator 28 (FIG. 6(*a*)), thus having a period of 2T, or a frequency of 1 MHz (FIG. 6(*c*)). The latch clock generator 30 also sends out pulses (FIG. 6(*d*)) in a double period 2T relative to that in the case of the continuous display. Since the AND gate 26j has one input coming from the zero detector 26e maintained at level "1" for a duration of $t_1$ and the other input comming from the decoder 26b maintained at level "1" for a duration of $2t_1$, it produces the AP signal with level "1" in the former period of $t_1$ as shown in FIG. 6(*g*).

Figure 6:
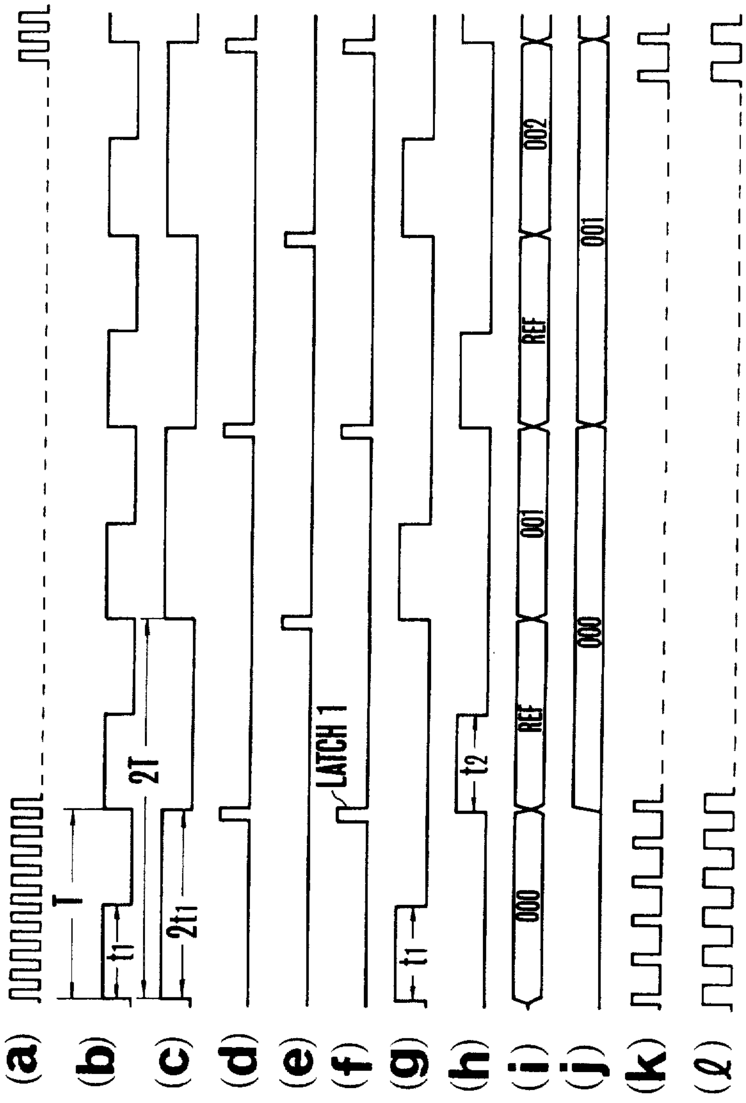

The AND gate 30b receives an output of the decoder 30a (FIG. 6(*d*)) at the end of the period $2t_1$ while the output of the zero detector 26e is at "1," and it then outputs the LATCH 1 signal as shown in FIG. 6(*f*). Accordingly, while the AND gate 26j outputs an image pattern memory address clock, AP, the image memory address register 34 sends an address data, "000" for example, shown in FIG. 6(*i*) to the image pattern memory 50 through the AND gate 40a and OR gate 40d so that image data stored in that address is sent over the lines 50a and 50b. Data on the line 50a is stored in the shift register 32 by the LATCH 1 signal from the AND gate 30b. This operation is shown in FIG. 6(*j*). In the figure, label "000" described within the waveform means that this image data corresponds to address "000" in the image pattern memory 50.

Output "01" from the zoom ratio hold register 23 is also sent to the coincidence circuit 25b within the shift clock generator 25. The coincidence circuit 25b outputs a coincidence signal each time the counter 25a counts one clock pulse from the dot timing clock generator 28, that is, at a timing when the second clock pulse is counted, so as to reset the counter 25a. Consequently, the zero detector 25c which receives the parallel output of the counter 25a sends a pulse as shown in FIG. 6(*l*) having a period and pulse width twice those of the dot clock pulse (FIG. 5(*a*)) to the AND gate 25d. The AND gate 25d, in turn, transmits the dot timing clock signal as the shift pulse SP while it receives "1" from the zero detector 25c. The waveform of this SP, shown in FIG. 6(*k*), has a period of twice that in the case of the continuous display as shown in FIG. 5(*k*), resulting in the frequency of 10 MHz. The shift register 32 sends a serial image data to the CRT display unit 60 sequentially in response to the shift pulse SP.

When the zero detector 26e within the address clock generator 26 makes a transient from "1" to "0" at the middle of the period T, the AND gates 26j and 30b which have been enabled are disabled. In contrast, the AND gates 26f and 26g which have received the output of the zero detector 26e through the inverters 26h and 26i are then enabled. Then, the AND gate 26f transmits the output of the decoder 26b (FIG. 6(*h*)) to the refresh address counter 36 as the refresh address gate pulse RGP. The AND gate 26g transmits the output of the decoder 30a (FIG. 6(*e*)) to the refresh address counter 36 as the refresh address clock pulse RAP.

The refresh counter 36 counts one RAP pulse while receiving an RGP pulse, and sends its output to the switch circuit 40. In the switch circuit 40, the AND gate 40a is disabled when the zero detector 26e within the address clock generator 26 stops sending its output, and the AND gate 40b is enabled by input "1" from the inverter 40c. Then, the output of the refresh address counter 36 is transmitted through the AND gate 40b and OR gate 40d to the image pattern memory 50. (Refer to FIG. 6(*i*)).

Consequently, the image pattern memory 50 sends image data over the lines 50a and 50b according to the refresh address pointed by the refresh counter 36 for a duration of $t_2$ following a period of $2t_1$. However, the shift register 32 does not fetch the image data, since the LATCH signal is not sent then from the AND gate 30b within the latch clock generator 30. Therefore, the shift register 32 retains previous data corresponding to address "000" as shown in FIG. 6(*j*). On the other hand, data on the line 50b is fed back and rewritten into the memory 50. It should be noted that the shift register 32 stores data which has been fetched previously from the memory and reads out that data sequentially during the refresh operation.

Again, the coincidence circuit 26d within the address clock generator 26 outputs "1" while the contents of the counter 26c coincide with the output of the zoom ratio hold register 23. This time, the zero detector 26e outputs the second "1" in FIG. 6(*g*) to enable the AND gate 26j, so that address "001" stored in the image memory address register 34 is transmitted through the switch circuit 40 to the image pattern memory 50. Subsequent operations are the same as described earlier.

It will be seen from the above explanation that the signal latch writes display data into the shift register 32 every two cycles of the address clock sent from the decoder 26*b*, since the latch signal is valid for production of one pulse by counting 10 shift pulses SP. By this operation, a pattern can be displayed on the screen at a magnified scale without interruption.

In other words, to display an image pattern stored in the image pattern memory on a CRT display at a magnified scale, an image data to be displayed is read out from the image pattern memory and displayed on the CRT display during a first period, and image memory data which has not been used for display is refreshed during a subsequent second period. A period for refreshing is also a period for displaying data which has been read out from the image pattern memory in the immediately preceding first period. Accordingly, on the CRT screen, data which has been stored in a certain address of the image pattern memory is displayed during a period of an expanded address clock signal, resulting in the display with a magnified scale.

Upon completion of the display operation for the first scanning line, as described above, control proceeds to the display operation for the second scanning line. At the end of the display operation for first scanning line, the frequency divider 70*a* sends a pulse to the counter 70*b*. At this time, the coincidence circuit 70*c* retains information "01" which has been sent from the zoom ratio hold register 23. The coincidence circuit 70*c* then outputs "0," since the contents of the counter 70*b* do not coincide with the contents of the register 23. The counter 70*b*, then, counts one pulse coming from the frequency divider 70*a*.

On the other hand, when the CPU 20 receives "0" from the coincidence circuit 70*c*, the controller 20*b* sends addresses "000," "001," and so on, from the memory 20*a* to the image memory address register 34 sequentially in the same way as in the case of the first scanning line.

When the address data transmission for the second scanning line is completed, the frequency divider 70*a* again sends one pulse to the counter 70*b*. The counter 70*b* contains "01" then and the zoom ratio hold register 23 also contains "01," thus the coincidence circuit 70*c* sends coincidence signal "1" to the counter 70*b* and the CPU 20. The counter 70*b* is reset to "00" by the coincidence signal, and it is ready to receive another pulse from the frequency divider 70*a*. Receiving the coincidence signal "1," the CPU 20 sends addresses "040," "041," and so on, for the virtual second scanning line to the image memory address register 34, sequentially under control of the controller 20*b*.

These operations are repeated sequentially until one frame of display is completed.

Figure 8:
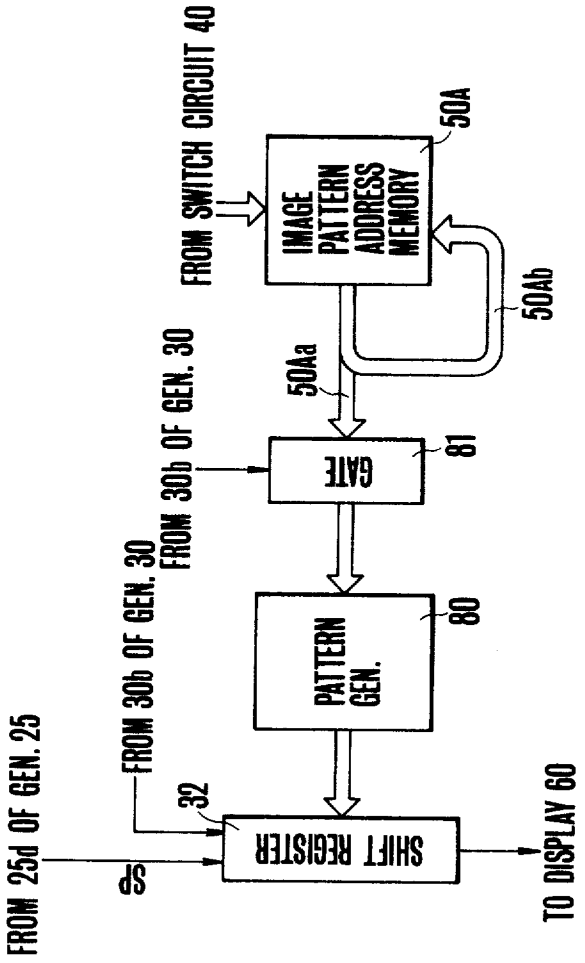
FIG. 8 is a partial schematic block diagram showing a modified version of the image pattern control system according to the present invention.

FIG. 8 shows a modified embodiment of the present invention. The image pattern memory 50 in FIG. 4 stores image data itself. However, the memory may be provided to store addresses of an image pattern. FIG. 8 shows an example of such an arrangement, where same portions as those illustrated in FIG.4 are omitted.

In FIG. 8, an image pattern address memory 50A of a dynamic memory type sends out data related to a pattern address of a pattern generator 80, which is subsequent to the switch circuit 40 in FIG. 4, according to information sent from the switch circuit 40. This data is sent out over lines 50A*a* and 50A*b*. Data on line 50A*a* is sent to the pattern generator 80 through an AND gate 81 which is enabled by the signal coming from the AND gate 30*b* within the latch clock generator 30 in FIG. 4. Data on line 50A*b* is fed back to the image pattern address memory 50A for refreshing.

Image data selected in the pattern generator 80 is sent to the shift register in the parallel form. The shift register 32 fetches the output of the pattern generator 80 each time it receives a LATCH signal from the latch clock generator 30, then sends the data serially to the display unit 60 when it receives a shift pulse SP from the shift clock generator 25. Operations which characterize this modification are identical to those in the first embodiment.

The present invention is not limited to the foregoing embodiments; rather, it is apparent that various changes and modifications are possible in applications of the invention. For instance, a 2-bit zoom ratio hold register is used in the above embodiments; however display at a larger scale factor becomes possible by use of a 3 or more bit scheme.

Although the image pattern memory is illustrated as a single block in the above embodiments, it is also possible to configure a large capacity memory which stores image data for one frame or more by employment of multiple memory chips. In this case, data stored in the same address on each chip can be refreshed simultaneously.

In the above embodiments, the basic clock frequency is divided using a counter; however, it may be obtained from other means, such as a shift register, which provide the necessary frequency division.

Although in the FIG. 4 embodiment the address register designates the memory address and carries out the refreshing operation, the refreshing may be effected at a period which follows the address designation. In such a case, the refresh address counter type 36 in FIG. 4 is of a usual program counter which accumulates the contents by one, starting from zero, for example, and it addresses the image pattern memory 50 sequentially starting from address "0" and with increment by one when data is displayed at a magnified scale. With this construction, the refresh address counter carries out refreshing for all addresses of the image pattern memory, and therefore, a simultaneous refreshing which takes place when display data is read out may be omitted.

Besides the above embodiments, there are several known types of system for displaying a pattern at a magnified scale, such as one wherein each picture element is once partitioned and then assembled after fragments of a pattern are magnified, and an other in which additional memory means is provided for storing magnification image data. However, this invention can be applied to any type of image pattern control system using a dynamic memory which needs refreshing.

Further, it should be understood from the foregoing description that, in accordance with the present invention, the single dynamic memory 50 is addressed by two addressing means, a first addressing means being the address register 34 and a second addressing means being the refresh counter 36, and particularly, the dynamic memory is refreshed by the second addressing means while the data designated by the first addressing means it being read out and delivered out, so that the dynamic memory can steadily be refreshed without causing the interruption of delivery of the data being used for operation or display. Advantageously, this leads to high speed and smooth operation and/or display of the data, for example, display of a picture built up with continuous straight-line segments even at a magnified scale. For this reason, the present invention can be applied not only to the magnified display but also to data transfer in which data is transferred from the dynamic memory to devices of slow accessing time such as an input/output device and a memory device. In the latter application, reading-out of the dynamic memory is necessarily performed at a low cycle. However, at has been explained with reference to the foregoing embodiments, the frequency of the clock signal may be changed for prolongation of the read-out cycle. Even with such a low speed delivery of data, the refreshing operation is not affected thereby to ensure that the dynamic memory can steadily be refreshed.

For refreshing, there is available either a method wherein data read out by the first addressing means is sent to the output unit and at the same time rewritten into the dynamic memory (in this method, the second addressing means may designate only an address which is not designated by the first addressing means) or another method wherein the first addressing means is exclusively used for reading out the output data and the second addressing means is exclusively used for reading out the refresh data. In particular, since the refreshing operation may be started with any data provided that at least one refreshing is effected within the time required for storage of the dynamic memory, the second addressing means may be realized by a programmable counter (as in the embodiments) and a shift register which can select all the addresses in the dynamic memory at a predetermined cycle, a counter which repeats counting predetermined counts under the application of the clock signal, or the like, thereby making it possible to simplify the system design.

What is claimed is:

1. An image pattern control system comprising:
- a dynamic memory:
- a zoom ratio hold register;
- an address register which stores addresses for reading out the contents of said dynamic memory;
- a refresh address counter which stores addresses of the contents read out from said dynamic memory for refreshing;
- a switch circuit which sends out a control signal at a predetermined timing according to an output of said zoom ratio hold register; and
- a switch circuit which, under the control of the control signal, selects outputs of the address register and the refresh address counter to send out the output of said address register to said dynamic memory during a first period and the output of said refresh address counter to said dynamic memory during a subsequent second period, whereby said dynamic memory reads stored data according to said address register output during said first period and refreshes stored data according to said refresh address counter output in said subsequent second period related to a magnified display.

2. An image pattern control system in accordance with claim 1, wherein said dynamic memory stores image pattern data.

3. An image pattern control system in accordance with claim 1, wherein said system further comprises:
- a pattern generator which sends out an image pattern signal related to an image pattern to be displayed, according to the output of said dynamic memory; and
- a gate means provided between said dynamic memory and said pattern generator, said gate means being enabled at the end of said first period in synchronism with said switching operation, said dynamic memory storing image pattern signal selection addresses for said pattern generator.

4. An image pattern control system in accordance with claim 1 or 2, wherein said system further comprises a shift register which effects parallel-series conversion of the output of said dynamic memory.

5. An image pattern control system in accordance with claim 3, wherein said system further comprises a shift register which effects parallel-series conversion of the output of said pattern generator.

6. An image pattern control system in accordance with claim 1, wherein said system further comprises:
- a basic clock generator; and
- a means for controlling delivery of the output of said address register according to outputs of said basic clock generator and said zoom ratio hold register, said means producing a count clock pulse for said refresh counter and controlling delivery of the output of said refresh counter.

7. A system with memory refreshing function comprising:
- a dynamic memory for storing data corresponding to addresses;
- means for transferring the data read out of the memory;
- first addressing means which addresses the memory to read out the data to be sent to the transferring means;
- refreshing means for rewriting the data into the memory; and
- second addressing means, provided independent of the first addressing means, for generating addresses for read-out of the data to be refreshed,
- whereby the data for the addresses designated by the second addressing means are refreshed while the data designated by the first addressing means are delivered out through the transferring means.

8. A system in accordance with claim 7, wherein said transferring means functions to transfer the data received from the memory either at a high speed or at a low speed, and during the low speed data transfer, the refreshing operation is carried out through the use of the second addressing means.

9. A system in accordance with claim 7, wherein said data comprises pattern display data, and the transferring means transfers the pattern display data to a display unit.

* * * * *